June 8, 1965

G. F. L. EHLERS 3,187,556

AUTOMATIC RECORDING VICAT TYPE APPARATUS FOR
HEAT DISTORTION AND MELTING POINT
DETERMINATIONS

Filed Aug. 7, 1962

INVENTOR.
GERHARD F.L. EHLERS

BY

ATTORNEYS

June 8, 1965 G. F. L. EHLERS 3,187,556
AUTOMATIC RECORDING VICAT TYPE APPARATUS FOR
HEAT DISTORTION AND MELTING POINT
DETERMINATIONS
Filed Aug. 7, 1962 2 Sheets-Sheet 2
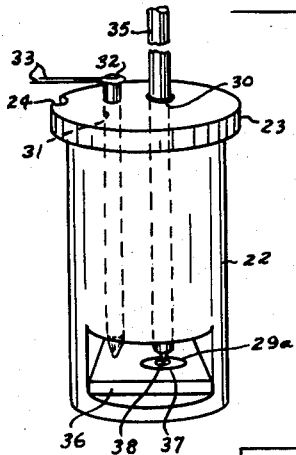
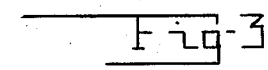
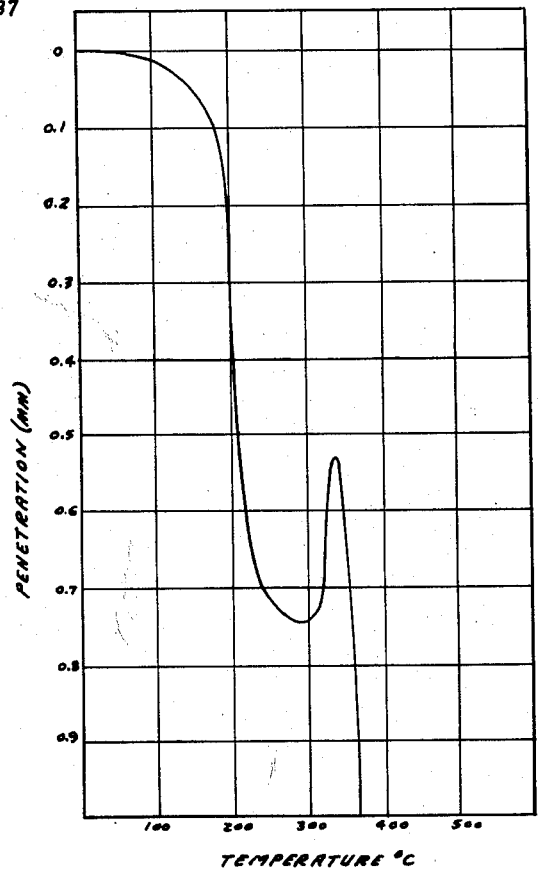
INVENTOR.
GERHARD F. L. EHLERS
BY
ATTORNEYS United States Patent Office 3,187,556
Patented June 8, 1965

3,187,556
AUTOMATIC RECORDING VICAT TYPE APPARATUS FOR HEAT DISTORTION AND MELTING POINT DETERMINATIONS
Gerhard F. L. Ehlers, Fairborn, Ohio, assignor to the United States of America as represented by the Secretary of the Air Force
Filed Aug. 7, 1962, Ser. No. 215,471
4 Claims. (Cl. 73—17)
(Granted under Title 35, U.S. Code (1952), sec. 266)

The invention described herein may be manufactured and used by or for the United States Government for governmental purposes without payment to me of any royalty thereon.

This invention relates generally to testing apparatus and specifically to a Vicat test apparatus for heat distortion and melting point determinations.

The method of testing for the "Vicat Softening Point" of a specimen plastic solid, together with an apparatus therefor, is described by ASTM Tentative Method (ASTM Designation: D1525–58T) wherein a specified load is applied to a specimen by a Vicat needle with a flat ended bearing cross section of 1 sq. mm. The specimen is then heated in an immersion bath by a heat transfer liquid at a uniformly rising rate of temperature. "Vicat Softening Point" is defined as the temperature at which the specimen is penetrated by the needle to a depth of 1 mm.

Test criteria with apparatus heretofore available has required additional equipment for circulating the heat transfer medium to insure thermal uniformity. Also, the possibility of a specimen reaction with the heat transfer liquid had to be avoided. Furthermore, the oil bath and air oven heaters previously utilized, are intrinsically limited in range having an upper temperature limit of about 220° C. Finally, the visual observations inhering to prior apparatus may yield subjective and inaccurate data.

Prior determinations of melting and softening points for powderous materials was normally done by visual observation of the powder in a capillary heated at an undefined rate. Visual determination is sufficient for materials with definite defined melting points and low melt viscosities, however, is not practical for all materials. Furthermore, an objective record of the softening behavior characteristics over a wide temperature range was not available by such method.

Thus, it is an object of this invention to provide a universal Vicat apparatus capable of accurately testing both solid and powdered materials.

It is an object of this invention to provide a Vicat testing apparatus capable of automatically recording data of the softening and melting characteristics of plastics over a wide range of temperature.

Another object of this invention is to provide a Vicat test apparatus having a high temperature range up to 500° C.

Other objects and a fuller understanding of the invention may be had by referring to the following description and claims, taken in conjunction with the accompanying drawings in which:

FIG. 2 is an enlarged perspective of a specimen holder of the invention, together with a powdered specimen and mold therefor.

FIG. 3 shows a curve typical of a powderous plastic subjected to test by the invention apparatus.

Figure 1:
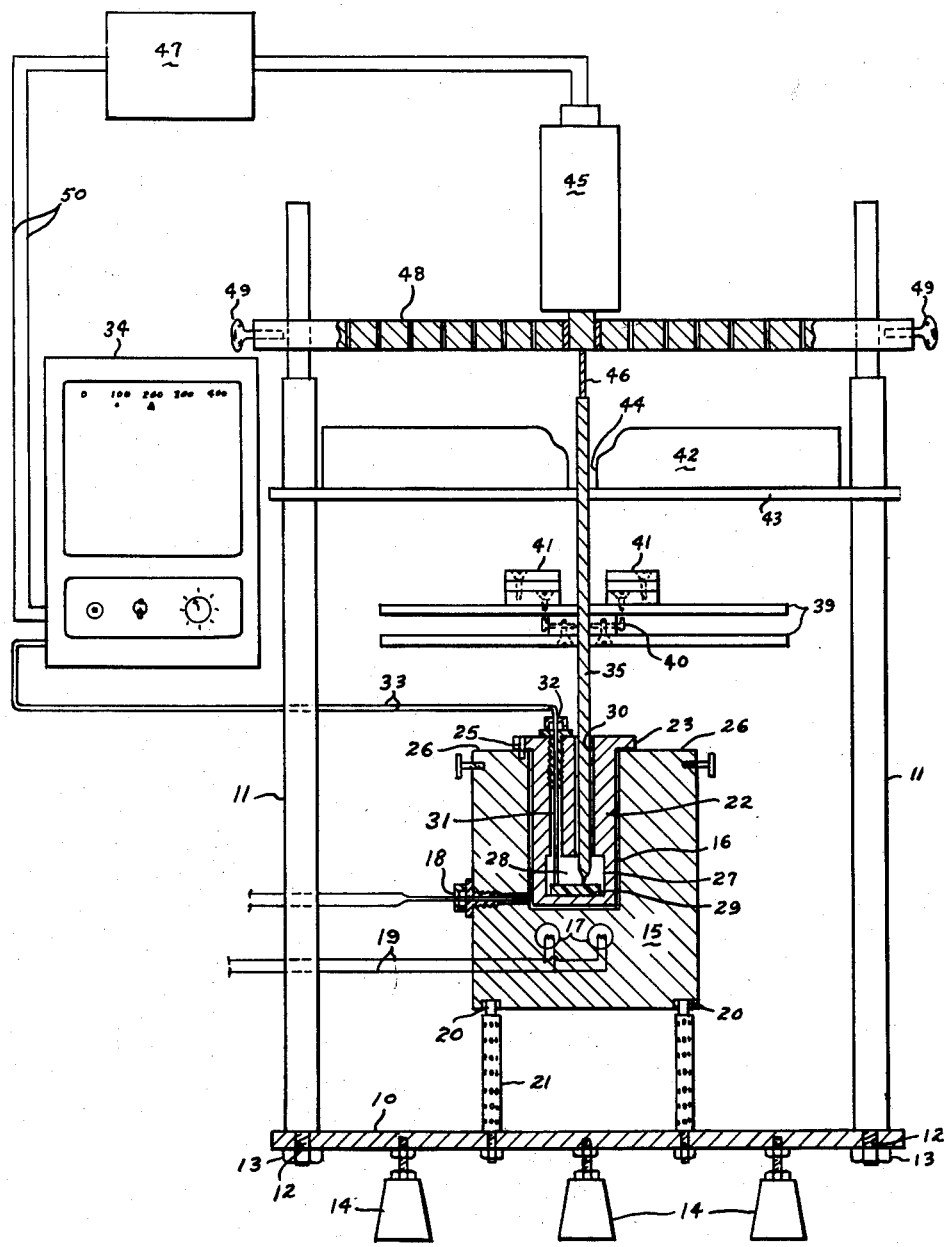
FIG. 1 is a schematic elevational cross section of the invented Vicat apparatus.

With reference to the drawings, a support structure is provided by horizontal base plate 10 and the associated support rods 11. Base plate 10 is a circular disk with a pair of spaced support bores 12, each drilled near an opposed end of a diameter through the disk. Support rods 11 have reduced threaded portions received and extending through bores 12 to be securely bolted by nuts 13 in an upright position upon the base disk 10. Absolute stability and horizontal leveling is accomplished by resting the support structure upon three adjustable widely spaced points, such as rubber feet 14.

Heater block 15 is a solid cylinder of high thermal conducting substance, such as copper or aluminum, having a bore drilled at the cylinder center to provide receiving well 16. Electrical cartridge heating coil units 17 and a control thermocouple 18 are inserted into respective recess wells bored in block 15 as indicated. Heating current is provided through conduits 19 from a standard current varying device (not shown) which may be controlled either manually or automatically to supply a desired increasing rate of heating current. Temperature indications of thermocouple 18 may be utilized in conjunction with the current varying device, for a heat control. Heater block 15 is securely seated at recesses 20 upon three mounting legs 21, perforated for cooling purposes, which have been fastened in upright symmetrically spaced positions about the center of base disk 10.

Specimen holder 22 is a solid stainless steel cylinder of smaller diameter than receiving well 16 to be loosely received therein. As shown in FIGS. 1 and 2, an encircling support lip 23, at the upper portion of holder 22, has a guide notch 24 matching a corresponding spacer stud 25 projecting from surface 26 of heater block 15. A rectangular transverse opening 27, near the bottom of holder 22, provides, in association with the surrounding walls of well 16, an enclosed chamber 28 containing specimen 29. Lip 23, resting upon surface 26, supports holder 22 within well 16 with chamber 28 located at a central internal position within heater block 15. Vertical guide bore 30 and bore 31 are drilled longitudinally to chamber 28. Temperature indicating means, a spring loaded bayonet thermocouple 32, is inserted into bore 31 and extends into chamber 28. Temperature indications of thermocouple 32 are conveyed by conduits 33 to an external input such as X–Y recorder 34.

Vicat needle 35 is an elongated rod necked down at its lower end to give a flat end cross-sectional area of 1 sq. mm. Needle 35 is slidably received by guide bore 30, sliding downward into chamber 28 to rest upon specimen 29.

As illustrated in FIG. 2, specimen mold 36, a solid rectangle with a specimen recess 37 therein, is snugly fitted within chamber 28. Recess 37 is of shallow cylindrical conformation having a 0.040" depth with a 5/16" diameter and containing a powdered specimen 29a therein. Needle 35 bears upon specimen 29a through a loading foot provided by a 1/4" diameter stainless steel disk 38.

Cooling fins are provided by aluminum disks 39, separated by spacer core 40 an affixed in a suitable manner to the approximate midportion of needle 35 in a horizontal position over heater block 15. A portion of the test load is provided by the disks 39, core 40 and needle 35. If desired, additional weights 41 may be symmetrically mounted upon disk 39 as shown.

Insulator 42 is a disk of heat insulating material horizontally supported over cooling disks 39 upon a support bar 43 secured between support rods 11. A central opening 44 in insulator 42 allows needle 35 to extend therethrough.

Means for sensing vertical movement of said needle are provided by linear displacement transducer 45, which is an accurate, extremely sensitive differential transformer device producing an output voltage precisely proportional to displacement of plunger shaft 46. Regulated A.C. excitation for transducer 45 is provided by exciter-demodulator 47, which also receives and demodulates the transducer output signal to supply a filtered D.C. output voltage proportional to plunger shaft 46 displacement. A suitable, commercially available transducer and exciter-demodulator combination is the "Daytronic Linear Displacement Transducer" and "Daytronic Exciter-Demodulator, Model 200H," Daytronic Corp., Dayton, Ohio. Transducer 45 is mounted on support bar 48 which, in turn, is secured at each end to support rods 11 by thumb screws 49 and is perforated to prevent excess heat conduction to the transducer.

Means for continuously recording specimen temperature and needle movement are provided by graphic X-Y recorder 34, capable of accepting D.C. voltage input signals and translating them to graph coordinates. Exciter-demodulator output voltage is conveyed by conduits 50 to an input of X-Y recorder 34, and is accepted by the recorder, along with the D.C. voltage signals proportional to specimen temperature sent through conduits 33, to plot the needle penetration against specimen temperature similar to the example shown in FIG. 3.

For conducting a test with a powdered specimen, specimen mold 36 is used. To facilitate removal of the specimen after test completion, recess 37 is covered with metal foil, usually a layer of 0.5 mil aluminum. The recess 37 is filled with a tamped powdered specimen 29a to a desired depth. Loading foot 38 is placed upon the surface of the powdered specimen 29a and affords a bearing surface for needle 35.

The test specimen 29a and mold 36, or a solid test specimen 29 are placed within chamber 28 with needle 35 resting upon the surface of the specimen. The recorder is zeroed, and heat is applied at an increasing rate of 150° C. per hour. Whereas the specimen is located at a position deep within the heater block 15, it is possible to apply an even uniform heat up to approximately 500° C. Cooling disks 39 dissipate heat conducted by needle 35 while simultaneously baffling the radiation heat of heater block 15. Insulator 42 completes the protection for the sensitive transducer 45 from the high temperature involved herein. The test data recorded by X-Y recorder 34 will yield a curve similar to FIG. 3. The curve illustrated is for a powderous material and shows a softening temperature of 200° C. The hump between 330° C. and 360° C. indicates decomposition of the material, with the resulting gas formation expanding under foot 38 and lifting needle 35 to escape.

Although a single embodiment of the present invention has been illustrated and described, it will be apparent to those skilled in the art, that various changes and modifications may be made therein without departing from the spirit of the invention or from the scope of the appended claims.

I claim:

1. A Vicat heat distortion and melting point apparatus, comprising: a horizontal base; a vertically disposed support sustained by said base; a solid cylindrical heater block of high thermal conductivity mounted on said base, said block of large mass relative to a test specimen to provide therefor a uniform rate of heat and having a concentric cylindrical receiving well centrally bottomed therein; a solid cylindrical specimen holder closely received in said well and having a rectangular opening transversally through one end to define a central internal chamber within said block for a test specimen therein, said holder having a thermocouple and a vertical guide bore communicating with said chamber; a Vicat needle guided in said bore with free vertical movement to be seated upon said specimen; a cooling disk affixed to said needle in horizontal position over said block; a weight mounted on said cooling disk; a linear displacement transducer secured to said support over said cooling disk in operative contact with said needle for activation by vertical movement thereof; and means responsive to said thermocouple and transducer for continuously plotting a curve of specimen temperature and needle movement.

2. A Vicat heat distortion and melting point apparatus, comprising: a horizontal base disk; a pair of support rods vertically sustained and diametrically spaced on said base; a solid cylindrical heater block of high thermal conductivity concentrically mounted on said base disk, said block of large mass relative to a test specimen to provide therefor a uniform rate of heat and having a concentric cylindrical receiving well centrally bottomed therein; a solid cylindrical specimen holder closely received in said well and having a rectangular opening transversally through one end to define an internal central chamber within said block for a test specimen therein, said holder having a thermocouple and a vertical guide bore communicating with said chamber; a Vicat needle guided in said bore with free vertical movement to be seated upon said specimen; a cooling disk centrally affixed to said needle over said block; weights symmetrically mounted on said cooling disk; a linear displacement transducer secured between said rods over said cooling disk in operative contact with said needle for activation by vertical movement thereof; and a graphic recorder responsively connected to said thermocouple and transducer, plotting a curve of specimen temperature and needle movement.

3. A Vicat heat distortion and melting point apparatus, comprising: a horizontal base disk; a pair of support rods vertically sustained and diametrically spaced on said base; perforated mounting legs affixed to said base; a solid cylindrical heater block of high thermal conductivity concentrically mounted over said base disk on said legs, said block of large mass relative to a test specimen to provide therefor a uniform rate of heat and having a concentric cylindrical receiving well centrally bottomed therein; a solid cylindrical specimen holder closely received in said well and having a rectangular opening transversally through one end to define an internal central chamber within said block for a test specimen therein, said holder having a thermocouple and a vertical guide bore communicating with said chamber; a Vicat needle guided in said bore with free vertical movement to be seated upon said specimen; a plurality of cooling disks centrally affixed to said needle over said block; weights symmetrically mounted on said cooling disks; an insulator disk secured between said rods over said cooling disks, said insulator having a central opening with said needle extending therethrough; a linear displacement transducer secured between said rods over said insulator and in operative contact with said needle for activation by vertical movement thereof; and a graphic recorder responsively connected to said thermocouple and transducer, plotting a curve of specimen temperature and needle movement.

4. A Vicat distortion and melting point apparatus, comprising: a horizontal base disk; a pair of support rods vertically sustained and diametrically spaced on said base; perforated mounting legs affixed to said base in spaced symmetrical relationship; a solid cylindrical heater block of high thermal conductivity concentrically mounted over said base disk on said legs, said block of large mass relative to a test specimen to provide therefor a uniform rate of heat and having a concentric cylindrical receiving well centrally bottomed therein; a solid cylindrical specimen holder closely received in said well and having a rectangular opening transversally through one end to define a central internal chamber within said block, said holder having a thermocouple and a vertical guide bore communicating with said chamber; a specimen mold within said chamber containing a powdered test specimen therein; a Vicat needle guided in said bore with free vertical movement to be seated upon said specimen; a plurality of horizontal cooling disks centrally affixed to said needle over said block; weights symmetrically mounted on said cooling disks; a horizontal insulator disk secured between said rods over said cooling disks, said insulator having a central opening with said needle extending therethrough; a linear displacement transducer secured between said rods over said insulator and in operative contact with said needle for activation by vertical movement thereof; and an X-Y recorder responsively connected to said thermocouple and transducer, plotting a curve of specimen temperature and needle movement.

References Cited by the Examiner
UNITED STATES PATENTS

| | | | |
|---|---|---|---|
| 2,351,572 | 6/44 | Kingston | 73—16 |
| 2,658,382 | 11/53 | Vanderkamp | 73—17 |
| 3,010,307 | 11/61 | Schwegler | 73—15.6 |

FOREIGN PATENTS 624,982  8/61  Canada.

OTHER REFERENCES

Mackenzie: Journal of Scientific Instruments, vol. 34, June 1957, pages 246, 247.

RICHARD C. QUEISSER, *Primary Examiner*.

DAVID SCHONBERG, *Examiner*.